United States Patent [19]

Itoh et al.

[11] 4,066,091
[45] Jan. 3, 1978

[54] PRESSURE SWITCHING VALVE DEVICE

[75] Inventors: Tomo Itoh, Katsuta; Syozo Yanagisawa, Ibaraki, both of Japan

[73] Assignee: Hitachi, Ltd., Japan

[21] Appl. No.: 609,937

[22] Filed: Sept. 3, 1975

[30] Foreign Application Priority Data

Sept. 11, 1974 Japan .................. 49-103879

[51] Int. Cl.$^2$ .................. F02M 7/20; F16K 31/365
[52] U.S. Cl. .................. 137/79; 29/446; 73/708; 92/40; 92/41; 137/81; 236/92 D; 261/DIG. 19; 261/39 A
[58] Field of Search .................. 73/393, DIG. 10; 137/78–81; 92/1, 34, 40, 41; 29/454, 446; 261/39 A; 236/92 D

[56] References Cited

U.S. PATENT DOCUMENTS

| | | | |
|---|---|---|---|
| 2,313,149 | 3/1943 | Jacobsson | 137/81 |
| 2,974,673 | 3/1961 | Culbertson | 137/81 |

*Primary Examiner*—Martin P. Schwadron
*Assistant Examiner*—Richard Gerard
*Attorney, Agent, or Firm*—Craig & Antonelli

[57] ABSTRACT

A pressure switching valve device including: a valve adapted to open and close an orifice defined in a valve seat; a diaphragm cooperating with the valve and so loaded as to maintain the valve in its open or closed position; and an atmospheric density compensating mechanism in engagement with the diaphragm to compensate for the opening and closing operations of the valve in response to the variation in atmospheric density, whereby the valve is opened and closed by impressing a given pressure on the diaphragm. This valve device features that the direction of a force exerted on the diaphragm so as to maintain the valve in its normally open or closed position is in coincidence with the direction of a force exerted by the atmospheric density compensating mechanism.

12 Claims, 7 Drawing Figures

PRESSURE SWITCHING VALVE DEVICE

This invention relates to a pressure switching valve device which impresses the pressure in a pressure source or interrupts the impression of same on a pressure responding means which effects a given displacement due to the aforesaid pressure, and more particularly to a pressure switching valve device having an atmospheric density compensating mechanism adapted to control the operation of a pressure switching valve in response to a atmospheric pressure and an atmospheric temperature.

With the prior art pressure switching valve device of the type described, the direction of a first force exerted by a compression spring on a diaphragm so as to maintain a valve secured to he diaphragm in its open or closed position is opposite to the direction of a second force exerted on the diaphragm by an atmospheric density compensating mechanism provided with a bellows which is built in a compressed condition where the bellows has been displaced or compressed from its free condition, whereby the difference between the aforesaid first force and the second force biases the valve to its normally open or closed position. As a result, the construction of the valve device is such that the first force conflicts with the second force in a coupling portion between the diaphragm and the atmospheric density compensating mechanism.

In the event that, due to the aforesaid conflict of the two forces, the two-force-conflicting or contacting portion is shifted laterally due to an impact or vibration stemming therefrom, then the aforesaid contacting portion remains difficult to return same to its initial position due to the two forces conflicting and contacting in the aforesaid manner, so that the acting lines of the first and second forces are deflected or bent, causing lateral oscillation. This lateral oscillation however causes a deflection of the axial lines of the valve and valve seat, leading to a failure in sealing condition. Such failure in sealing condition results in the variation in an operating pressure of the diaphragm, i.e., the operating pressure which has been set in the initial stage, so that the operation of the pressure responding means connected to the pressure switching valve device is rendered inaccurate.

It is an object of the present invention to provide pressure switching valve device which avoids the aforesaid shortcomings confronted by the prior art device of the type described and which maintains the initial operating pressure for a long period of time and functions accurately.

According to the present invention, there is provided a pressure switching valve device, in which the direction of a force exerted on a valve rod is brought into coincidence with that of a force exerted on the valve rod by an atmospheric density compensating bellows, so that a coupling portion between the valve rod and the bellows is brought into a given position consistently in a stable manner, whereby the sealing condition between the valve and the orifice in the closed position of the valve may be maintained in the initial condition, even if vibration is applied thereto.

Figure 1:
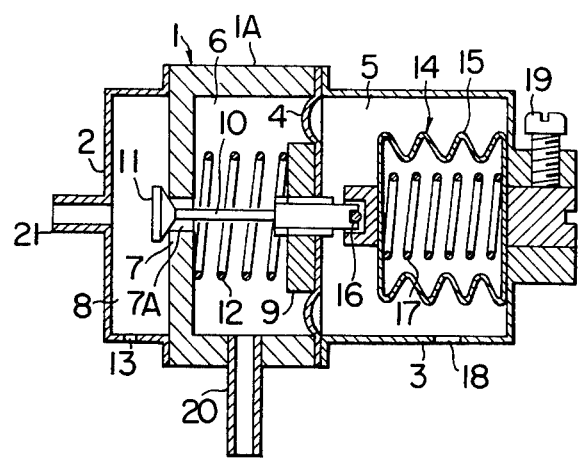
FIG. 1 is a longitudinal cross-sectional view showing the essential part of a pressure switching valve device according to the prior art.

With reference to FIG. 1, description will be given of an example of a pressure switching valve device equipped with a prior art atmospheric density compensating mechanism.

In FIG. 1, shown at 1 is the entire arrangement of a pressure switching valve device, at 1A a valve body and at 2 and 3 a cover and a case, respectively, which are secured to the opposite sides of the valve body. The valve body 1A is partitioned by the medium of a diaphragm 4 from the case 3, while an atmospheric pressure chamber 5 is defined in the case 3 and a pressure chamber 6 is defined in the valve body 1A, respectively. The valve body 1A is partitioned by the medium of a valve seat 7 formed on the valve body 1A, from the cover 2, in which is defined a control chamber 8. Defined in the cover 2, which defines the control chamber 8, is a small hole 13 communicated with a pressure responding means (not shown) which is controlled by means of the pressure switching valve device according to the present invention, the aforesaid small hole 13 being adapted to release the pressure responding means from its operation. A valve rod 10 is secured to the diaphragm 4 through the medium of a retainer 9, while a valve 11 engaging the valve seat 7 is integral with the tip of the valve rod 10. The valve 11 is adapted to open and close an orifice 7A defined in the valve seat 7. The diaphragm 4 is normally urged to the right as viewed in the drawing, by means of a spring 12 disposed within the pressure chamber 6, so that the valve 11 is biased in a direction to close the orifice 7A.

Provided within the atmospheric pressure chamber 5 is a bellows 15 constituting an atmospheric density compensating mechanism 14, while one end of the bellows 15 is secured to the case 3, while the other end thereof is urged against the valve rod 10 through the medium of a bellows pin 16.

Meanwhile an alcohol gas is filled in the bellows 15, so that the length of the bellows 15 is varied in response to the variation in the atmospheric temperature and pressure, thereby detecting the atmospheric temperature and pressure. Alternatively, the bellows 15 may be evacuated so as to detect the atmospheric pressure. Shown at 17 is a bellows spring which is provided within the bellows 15. Shown at 18 is a hole which communicates the atmospheric pressure chamber 5 with atmosphere and is located in a wall of the atmospheric pressure chamber 5, so that an atmospheric pressure may be introduced in the atmospheric pressure chamber 5 therethrough.

Shown at 19 is a bellows-securing-nut adapted to secure one end of the bellows 15 to the case 3. Shown at 20 is a pressure introducing pipe which communicates the pressure chamber 6 with a pressure source (Normally, a negative pressure prevails therein), and at 21 is a pressure discharging pipe which communicates the control chamber 8 with the pressure responding means.

With the aforesaid arrangement, if a negative pressure is introduced from the aforesaid pressure source into the pressure chamber 6, then the diaphragm 4 is displaced to the left, as viewed in FIG. 1, against the force of the spring, so that the valve 11, as well, is moved to the left. As a result, the orifice 7A is opened, so that negative pressure is introduced through the orifice 7A into the control chamber 8. The valve 11 is of a normally closed type, but may be changed to a normally open valve by reversing the left and right arrangement of the valve and the orifice 7A, without changing the other components.

A negative pressure introduced into the control chamber 8 is impressed on the pressure responding means by way of a pressure discharging pipe 21, so that the pressure responding means is driven. Accordingly, in case the atmospheric temperature is raised or the atmospheric pressure is lowered so that the atmospheric density is lowered, then the bellows 15 in the atmospheric density compensating mechanism 14 extends to thereby change the set pressure of a spring 12. The operation of the diaphragm 4 may be compensated for the variation in atmospheric density according to the variation in this set pressure.

Description has been given thus far of the prior art pressure switching valve device. However, the prior art device suffers from a disadvantage in that the initially set operating pressure varies during its service and thus is not stable. The review of actual products reveals that there is a pressure variation as much as ± 20 mmHg.

Such a discrepancy in the aforesaid prior art pressure switching valve device is attributable to the fact that the valve rod 10 pushes the bellows 15 against each other, so that there is created a lateral oscillation at the contacting point of the valve rod and bellows. This in turn causes the lateral deflection of the axial lines of the valve 11 and the orifice 7A, thus impairing the close contacting relation therebetween, with the result of a negative pressure leakage.

This phenomenon will be described in more detail by referring to FIG. 2.

Shown at A is a contacting point between the valve 11 of the valve rod and the orifice 7A, at B a contacting point between the right end of the valve rod 10 and the bellows pin 16 located at the left end of the bellows 15, and at C a point, at which the bellows 15 is secured to the case 3. In addition, the forces acting on these points and the directions thereof are shown by arrows. In this case, the force directed from the point A to the point B is that force of the spring mounted within the pressure chamber 6, which urges the valve rod 10 to the right by the medium of the diaphragm 4, while a force directed from the point C to the point B is the force of the bellows spring 17 urging the bellows 15 to the left so as to extend same. These two forces however have directions opposite to each other, and thus they are counteracting each other.

As a result, in case the position of the point B is shifted in a lateral direction by even a small distance, the position of the point B tends to move in the circumferential direction about the point A, thus shifting in a lateral direction. When the point B is moved in a lateral direction in this manner, then the contacting condition between the valve 11 and the orifice 7A is changed, so that the sealing condition therebetween is rendered instable, resulting in pressure leakage. This problem is likewise applied not only to the valve of a normally closed type but also a valve of a normally open type.

In other words, even in case a negative pressure acts within the pressure chamber 6, a negative pressure leaks through a gap between the valve 11 and the orifice 7A, so that the pressure acting on the diaphragm 4, i.e., the operating pressure of the diaphragm, is varied from a specified characteristic, resulting in an increase in error, and thus an accurate control may not be achieved.

Since the valve rod 10 pushes the bellows 14 against each other in the prior art pressure switching valve device, there is incurred a variation in the intially set operating pressure of the bellows in an attempt to bring the displacement of the bellows within a given characteristic range, so that the pressure responding means which is operably connected to the pressure switching valve device fails to operate accurately.

It has been proved that the present invention avoids the aforesaid shortcomings. Now, description will be given of one embodiment of the present invention by referring to FIGS. 3 and 4. In this respect, like parts are designated like reference numerals throughout FIGS. 1, 2, 3 and 4.

Figure 3:
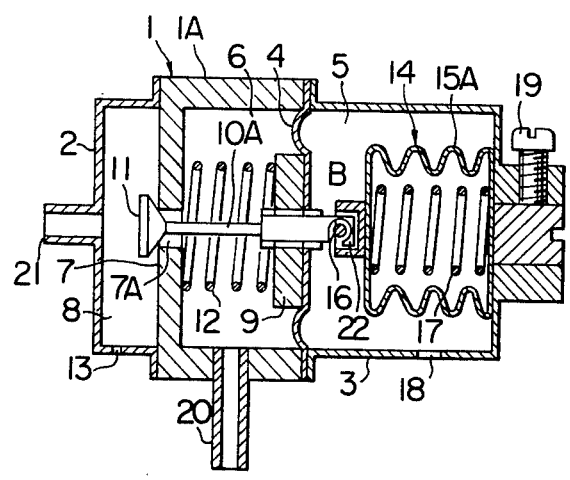
FIG. 3 is a longitudinal cross-sectional view showing the essential part of the pressure switching valve device according to the present invention.

Shown at 10A in FIG. 3 is a valve rod which is secured to the diaphragm 4 and is provided with a valve 11 at its tip (to the left), while the valve rod 10A is formed with a hook portion 22 at the other end thereof. The hook portion 22 engages the bellows pin 16 provided at the left end of the bellows 15A. With the bellows 15A according to the present invention, the bellows 15A is built in the device, with the bellows pin 16 in engagement with the hook portion 22 of the valve rod 10A, and with the length thereof being longer than that of the bellows maintained in the freed condition. In other words, in the atmospheric pressure condition, the bellows 15A is built in the device, being somewhat extended from the length of the freed bellows, with the bellows pin 16 in engagement with the hook portion 22 of the valve rod 10A. Accordingly, the bellows 15A in the pressure switching valve according to the present invention is maintained under tension, so that it exerts a force to pull the valve rod 10A to the right in the drawing.

The device shown in FIG. 3 is similar in construction to that of the prior art device given in FIG. 1, except for the arrangement described.

Figure 2:
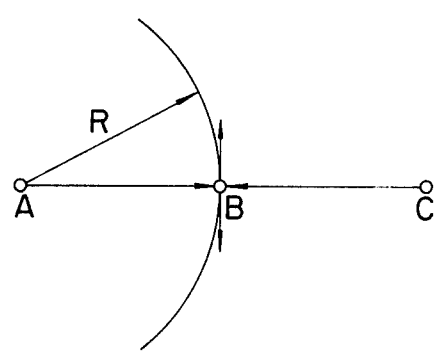
FIG. 2 is a force diagram showing the condition of a force acting so as to open or close the valve in the pressure switching valve device of FIG. 1.
Figure 4:
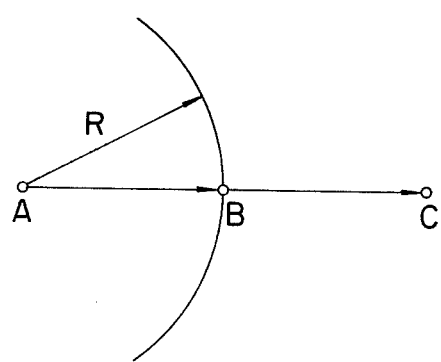
FIG. 4 is a force diagram showing the condition of a force acting so as to open or close the valve in the pressure switching valve device of FIG. 3.

FIG. 4 shows a diagram showing acting forces, corresponding to that of FIG. 2, of the pressure switching valve device of FIG. 3. Shown at A in FIG. 4 is a contacting point between the valve 11 of the valve rod 10A and the orifice 7A, at B is an engaging point between the hook portion 22 at the right end of the valve rod 10A and the bellows pin 16 at the left end of the bellows, at C a point where the bellows 15 is secured to the case 3. The forces acting on these points A, B, and C and the directions thereof are shown by arrows. In this case, a force directed from the point A to the point B is a force of the spring which urges the valve rod 10A to the right by the medium of the diaphragm 4, while a force directed from the point B to the point C is a force of the assembly consisting of the bellows 15A and the bellows spring 17, which pulls the valve rod 10A to the right through the medium of the hook portion 22. These two forces have the same acting direction, and act so as to urge the valve rod 10A secured to the diaphragm 4 to the right, as viewed in the drawing. The device according to the present invention differs in construction and advantage from the prior art pressure switching valve device, because of the aforesaid points.

According to the pressure switching valve device of the invention, even if the point B by any chance is laterally deviated from the line connecting the point A with the point C, due to vibration (external force), impact or the like, the point B will return to its home position instantaneously. In an ordinary case, the point B will not move laterally unlike the prior art device, and the points A, B, C are automatically maintained in alignment with each other. For this reason, the valve 11 and the orifice 7A are maintained in a given sealing condition all the time, so that the sealing condition in the contacting portion between the valve 11 and the orifice 7A are not varied due to vibration and the like. Accordingly, with the device of the invention, a pressure acting on the diaphragm 4, i.e., a diaphragm operating pressure is not varied from given characteristics, so that the initial operating pressure may be maintained for a long period of time, with the result of the acurate operation of the pressure responding means which is connected to the valve device of the invention.

The valve shown in FIG. 3 is of a normally closed type. However, the right and left positions of the valve 11 and the orifice 7A may be reversed so as to provide a valve of a normally open type. The description given of FIG. 4 may go for the normally open type valve having the construction the same as that of the normally closed type valve. Accordingly, the pressure switching valve of the invention includes the normally open type valve.

Now, description will be given of the second embodiment of the pressure switching valve device according to the invention with reference to FIGS. 5 and 6. In this respect, like parts are designated like reference numerals throughout FIGS. 1 to 6.

Figure 5:
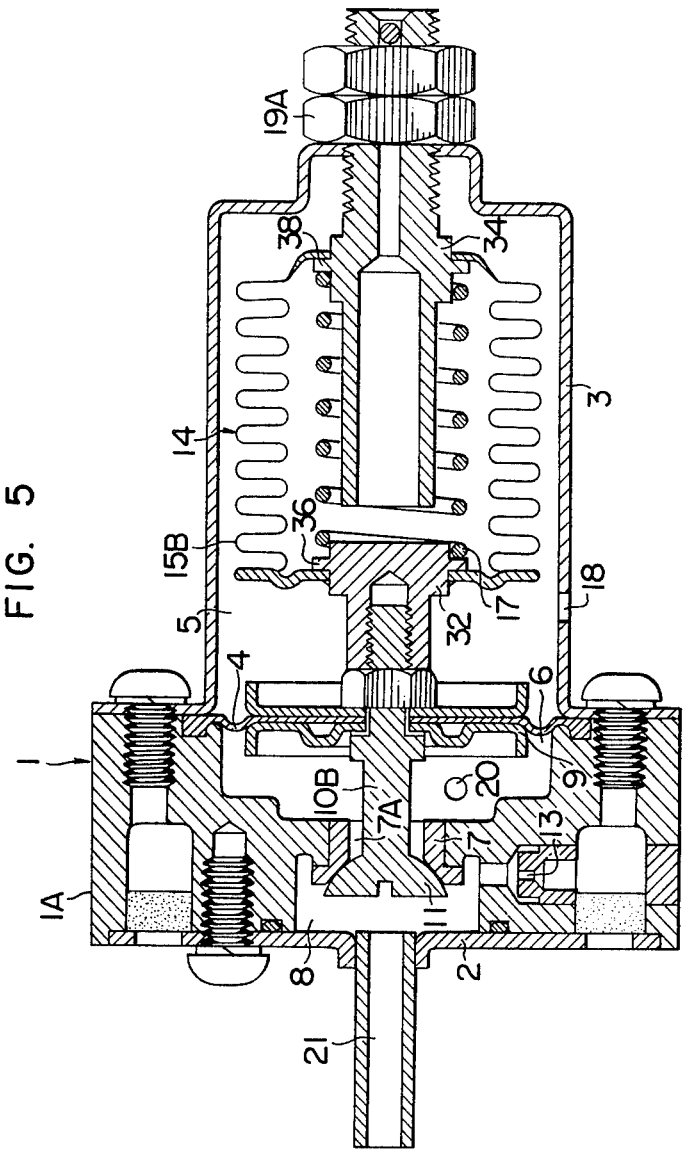
FIG. 5 is a longitudinal cross sectional view showing the essential part of the pressure switching valve device according to the second embodiment of the invention.

Shown at 10 B in FIG. 5 is a valve rod which is secured to the diaphragm 4 and equipped with the valve 11 at the left tip thereof, and the valve rod 10B is threaded at its right end into a left-hand attaching member 32 provided at the left end of a bellows assembly 14. Accordingly, the left-hand attaching member 32 of the bellows, valve rod 10B and diaphragm 4 are coupled together integrally. In the second embodiment, a spring adapted to urge the diaphragm provided in the prior art device and the first embodiment of FIG. 3 is omitted.

Provided at the right end of the bellows assembly 14 is a right-hand attaching member 34 which is secured by means of an attaching nut 19A at the right end of the case 3 so as to permit the adjustment of the axial position of the member 34.

The bellows 15B is assembled in the device by bringing the center openings in the opposite surfaces of the bellows in sealing engagement with the outer side surfaces of the flanges 36, 38 which are formed on the left-hand attaching member 32 and the right-hand attaching member 34, outwardly of the outer circumferential surfaces of the members 32, 34. Thus, when the bellows assembly 14 is built in the pressure switching valve device in the condition shown in FIG. 5, the bellows 15B is maintained in an extended condition where the length of the bellows 15B is greater than its length in the free condition, so that the bellows 15B exerts a force to urge the diaphragm 4 to the right through the medium of the valve rod 10B.

Shown at 17 is a bellows spring provided within the bellows 15B, and the spring 17 exerts a force to act against a restoring elastic force of the bellows 15B, i.e., an extending force of the bellows. However, the restoring elastic force of the bellows 15B is substantially larger.

The construction of the second embodiment of the present invention shown in FIG. 5 is the same as that of the first embodiment of FIG. 3 and the prior art device of FIG. 1, except for the points described thus far, and like parts are designated by like reference numerals.

Figure 6:
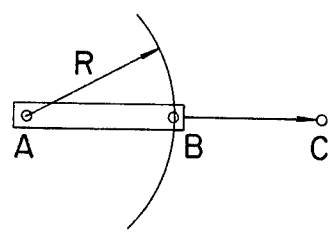
FIG. 6 is a force diagram showing the condition of a force acting so as to open or close the valve in the pressure switching valve device of FIG. 5.

FIG. 6 is a diagram showing the acting lines of forces, corresponding to those of FIGS. 2 and 4, in the case of the pressure switching valve device of FIG. 5.

In FIG. 6, shown at A is a contacting point between the valve 11 of the valve rod 10B and the orifice 7A, at B a right end of the valve rod 10B (In this case, the left-hand attaching member 32 of the bellows assembly 14 is threaded in the valve rod integrally therewith.), and at C a right-hand attaching member of the bellows 15B, i.e., the right-hand attaching member 34 secured to the right end of the case 3. In this respect, only a force directed from the point B to the point C acts as shown by an arrow. This force is obtained by the restoring elastic force of the bellows 15B assembled in the extended condition, (in the embodiment, a force less a spring force of the bellows spring 17) so that the valve rod 10B is urged to the right by the aforesaid force, i.e., in a direction, in which the valve 11 abuts the valve seat 7A and closes. Since the valve rod 10B and the left-hand attaching member 32 of the bellows assembly are secured integrally to each other, an internal construction is provided between the points A and B, including the diaphragm 4.

In the second embodiment of the present invention, like the first embodiment, there is no force which has an opposite direction and counteracts each other, between the points A and B, and between the points B and C, while the valve rod 10B is urged to the right only due to the force acting only in one direction (to the right). As a result, even if the position of point B is laterally shifted by a small distance due to vibration or impact during the service of the pressure switching valve device, the point B will return to its home position instantaneously. In the normal condition, as in the case of the prior art device of FIG. 1, the point B is not moved laterally, and the points A, B, C are maintained in given positions all the times, being positioned on a line. As a result, the sealing condition of the valve 11 and the orifice 7A is maintained consistent, so that the sealing at the contacting points is not affected by vibration and the like.

According to the second embodiment of the invention, as in the first embodiment of the invention, a pressure acting on the diaphragm 4, i.e., an diaphragm operating pressure is not varied from the specific characteristics, while the initial operating pressure may be maintained for a long period of time, and the pressure responding means connected to the valve device of the invention may be operated accurately.

Thus far, the second embodiment is shown, in which the valve 11 is of a normally closed type. However, the right and left positional relation between the valve 11 and the orifice 7A may be reversed, then there may be obtained a valve of a normally open type. In this case, the other portions of the valve may remain the same.

The present invention includes a pressure switching valve device provided with the aforesaid valve of a normally open type. In this case, however, the advantages and functions described by referring to FIG. 6 may be likewise obtained.

The test results reveal that the use of the pressure switching valve device according to the present invention may keep the operating pressure to less than 5 mmHg. The prior art device only attains the variation as much as ± 20 mmHg. Thus, it may be said that the device according to the present invention affords great improvements in its performance over the prior art device. With the valve device according to the present invention, as has been described in detail earlier, the valve 11 is so designed as to be closed due to the restoring elastic force of the bellows 15A, 15B in the atmospheric density compensating mechanism which is given as a bellows assembly. The bellows 15A, 15B are built in the device in the condition where the length of the bellows is greater than that of the bellows which is freed under the atmospheric pressure (within the atmospheric pressure chamber 5), i.e., in the extended condition, so that when the atmospheric density is lowered, the length of the bellows in the freed condition of the bellow is increased, so that the extending degree of the bellows being built in the device is decreased. It follows that the restoring elastic force of the bellows is lowered accordingly, and a force to pull the point B to the right is offset to an extent corresponding to a decrease in density. In this manner, like the prior art pressure switching valve device, there may be achieved compensation for the variation in atmospheric density.

Now, description will be given of the case where the pressure switching valve device of the invention, having a normally closed valve construction, is applied to a throttle opener device of a carburetor, by referring to FIG. 7.

The throttle opener device opens a throttle valve for a given time due to a negative pressure prevailing in the downstream of a carburetor throttle valve for the purpose of reducing the amount of unburnt components contained in exhaust gases from a motor vehicle, when the vehicle is decelerated.

Figure 7:
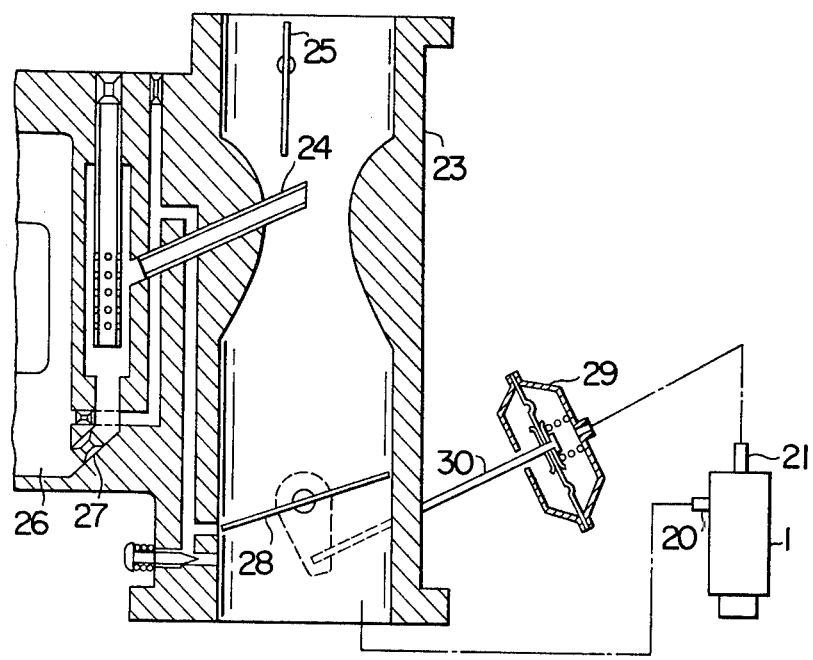
FIG. 7 is a view illustrating the case where the pressure switching valve device is applied to a throttle opener device for use in a carburetor of an engine of a motor vehicle.

In FIG. 7, shown at 23 is a carburetor body proper. Provided within the body proper 23 are a main nozzle 24, choke valve 25, float chamber 26, main jet 27 and throttle valve 28. Shown at 29 is a throttle opener device which cooperates with the throttle valve 28 through the medium of a rod 30. A negative pressure within an intake pipe of an engine is introduced by way of a pressure switching valve device 1 into the throttle opener device 29. Thus, upon deceleration of a motor vehicle, a negative pressure is introduced by way of the valve device 1 into the throttle opener device 29 to thereby open the throttle valve 28 for a given time due to the pressure-responding operation of the throttle opener device 29.

Recently, a catalyst convertor and the like are equipped in an exhaust system of a motor vehicle for reducing the amount of unburnt components contained in exhaust gases. However, in case a motor vehicle runs in a high land at a low atmospheric density, the use of the prior art throttle opener device alone results in overheating of a catalyst convertor. To cope with this, there has been adopted a system for controlling the operation of the throttle opener device (pressure responding means) in response to the variation in atmospheric density, with the aid of the pressure switching valve device 1.

However, with the prior art pressure switching valve device 1 as shown in FIG. 1, in case a motor vehicle runs on a rough way, the contacting point B between the bellows pin 16 and the right end of the valve rod 10 tends to be rotated along a circle having a radius of R shown in FIG. 2 about the contacting point A between the valve 11 and orifice 7A, due to the vibration stemming from the aforesaid running of a vehicle. As a result, the point B moves laterally, so that the contacting condition of the valve 11 and orifice 7A is varied, thus imparing the sealing condition.

Under such a condition, even if a negative pressure acts on the pressure chamber 6, a negative pressure will leak through a gap between the valve 11 and the orifice 7A, so that the operating pressure of the diaphragm 4 is varied, resulting in overheating of a catalyst convertor.

In contrast thereto, according to the pressure switching valve device of the present invention, even if vibration and the like are exerted on the valve device, the coupling portion between the bellows assembly (atmospheric density compensating mechanism) 14 and the valve rod (10A, 10B) will not move laterally, so that the operating pressure may be maintained at a given value even when a motor vehicle runs on a rough way. Thus, the throttle opener device equipped with the pressure switching valve device according to the present invention may eliminate the trouble of overheating in a catalyst convertor.

Meanwhile, description has been given of the throttle opener device as an example of the application of the device of the invention. However, other type pressure responding means may be used for satisfactory results.

We claim:

1. A pressure switching valve device comprising:
    a valve seat having defined therein an orifice;
    a valve member for normally opening and closing said orifice;
    a diaphragm integrally connected to said valve member, said diaphragm being operative in response to pressure thereon to move said valve member for opening said orifice; and
    an atmospheric density compensating mechanism cooperatively connected to said valve member and operative in response to variation in atmospheric density for compensating for the opening and closing movements of said valve member, said atmospheric density compensating mechanism normally exerting a force on said valve member so that the valve member closes said orifice, said force decreasing with the lowering of the atmospheric density.

2. A pressure switching valve device comprising:
    a valve seat having defined therein an orifice;
    a valve member for normally closing said orifice;
    a diaphragm integrally connected to said valve member, said diaphragm being operative in response to pressure thereon to move said valve member for opening said orifice;
    means for urging said valve member in the direction that said valve member closes said orifice; and
    an atmospheric density compensating mechanism cooperatively connected to said valve member and operative in response to the variations in atmospheric density for compensating for the opening and closing movements of said valve member, said atmospheric density compensating mechanism normally exerting a force on said valve member so that said valve member closes said orifice, said force decreasing with the lowering of the atmospheric density;
    wherein said urging means exerts a force on said valve member in the same direction as that of the force exerted by said atmospheric density compensating mechanism on said valve member.

3. A pressure switching valve device as set forth in claim 2, wherein said atmospheric density compensating mechanism includes a bellows, said bellows having an axial length which is extended in response to the lowering of the atmospheric density.

4. A pressure switching valve device as set forth in claim 3, wherein said atmospheric density compensating mechanism includes means for adjusting the axial length thereof, said means further adjusting the restoring elastic force of said bellows.

5. A pressure switching valve device as set forth in claim 2, wherein said means for urging said valve member in a direction to close said orifice is a compression spring confined between said valve seat and said diaphragm.

6. A pressure switching valve device as set forth in claim 2, wherein said atmospheric density compensating mechanism includes a bellows which is assembled in an extended condition therein, and wherein said bellows, said valve, and said diaphragm are coupled together by means of pins.

7. A pressure switching valve device comprising:
a valve seat having defined therein an orifice;
a valve member for normally closing said orifice;
a diaphragm integrally connected to said valve member, said diaphragm being operative in response to pressure thereon to move said valve member for opening said orifice;
a casing cooperating with said diaphragm to define a chamber;
a first attaching member positioned within said chamber and rigidly connected to said valve member;
a second attaching member positioned within said casing and secured to said casing axially away from said first attaching member; and
a bellows mounted between said first attaching member and said second attaching member and operative in response to atmospheric density in said chamber, said bellows being normally in an extended condition with respect to its free condition and exerting a force on said first attaching member in a direction for closing said orifice by said valve member, said force decreasing with the lowering of the atmospheric density.

8. A pressure switching valve device as set forth in claim 7, wherein means are provided for adjusting the axial position of said second attaching member; said means adjusting the degree of axial extension of said bellows to adjust the restoring elastic force thereof.

9. A pressure switching valve device as set forth in claim 7, wherein said bellows has axial end surfaces, each having therein an opening, and each of said first and second attaching members has a flange on the respective periphery, said openings in said respective axial end surfaces of said bellows abutting said flanges.

10. In a pressure switching device of the type including valve means for regulating flow of a pressure medium, said valve means including diaphragm means for actuating said valve means in response to pressure changes of said pressure medium, compensation means for compensating actuation of said valve means in response to atmospheric density changes, and coupling means for coupling said valve means and said compensation means, the improvement comprising means for stabilizing said coupling means against vibrational forces acting on said pressure switching device,
wherein the stabilizing mans includes means for exerting a resultant force on said coupling means, said resultant force always acting to restore said coupling means to axial alignment with said valve means and said compensation means, and
wherein said compensation means includes a bellows means acting on said coupling means, and said means for exerting a resultant force includes means for maintaining said bellows means in a condition axially expanded from the free state of said bellows means, the restoring force of said expanded bellows means providing at least a part of said resultant force.

11. A pressure switching device according to claim 10, wherein said valve means includes a valve seat having an orifice through which said pressure medium is regulated, a valve member for closing said orifice, said valve member being acted upon by said diaphragm means to open said orifice in accordance with a predetermined pressure of said pressure medium, and a valve stem extending between said valve member and said coupling means; wherein said coupling means is provided by a rigid connection of said valve stem to said bellows means; and wherein said restoring force of said bellows means constitutes the entire resultant force.

12. A pressure switching device according to claim 10, wherein said valve means includes a valve seat having an orifice through which said pressure medium is regulated, a valve member for closing said orifice, said valve member being acted upon by said diaphragm means to open said orifice in accordance with a predetermined pressure of said pressure medium, a valve stem extending between said valve member and said coupling means, and spring means surrounding said valve stem between said valve member and said diaphragm means for effecting an axial spring force between said valve member and said diaphragm means; wherein said coupling means is provided by an articulation means between said valve stem and said bellows means; and wherein said resultant force is constituted by the sum of said spring force and said restoring force of said bellows means, both acting on said coupling means in the same axial direction.

* * * * *